United States Patent
Mahadevan et al.

(10) Patent No.: US 12,468,671 B2
(45) Date of Patent: Nov. 11, 2025

(54) HEALTH-BASED MANAGEMENT OF A NETWORK

(71) Applicant: HEWLETT PACKARD ENTERPRISE DEVELOPMENT LP, Spring, TX (US)

(72) Inventors: Nilakantan Mahadevan, Bloomington, MN (US); Duncan Roweth, Bristol (GB); Vrashi Ponnappa Puchimanda Ramacha, Karnataka (IN); Laurence Scott Kaplan, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 159 days.

(21) Appl. No.: 18/160,563

(22) Filed: Jan. 27, 2023

(65) Prior Publication Data
US 2024/0256500 A1    Aug. 1, 2024

(51) Int. Cl.
| G06F 16/21 | (2019.01) |
| H04L 41/0631 | (2022.01) |
| H04L 41/12 | (2022.01) |
| H04L 43/024 | (2022.01) |

(52) U.S. Cl.
CPC .......... *G06F 16/212* (2019.01); *G06F 16/217* (2019.01); *H04L 41/0631* (2013.01); *H04L 41/12* (2013.01); *H04L 43/024* (2013.01)

(58) Field of Classification Search
CPC . G06F 16/212; G06F 16/217; H04L 41/0631; H04L 41/12; H04L 43/024
See application file for complete search history.

(56) References Cited

U.S. PATENT DOCUMENTS

| 9,749,888 B1 * | 8/2017 | Colwell ................ H04W 24/04 |
| 10,033,602 B1 | 7/2018 | Russell |
| 2012/0072465 A1 * | 3/2012 | McGowan .............. G06F 16/21 707/E17.055 |
| 2015/0142506 A1 * | 5/2015 | Kumar ............... G06Q 10/0635 705/7.28 |

(Continued)

OTHER PUBLICATIONS

Wikipedia, "Time series database", available online at <https://en.wikipedia.org/w/index.php?title=Time_series_database&oldid=1118141283>, Oct. 25, 2022, 3 pages.

*Primary Examiner* — Ann J Lo
*Assistant Examiner* — Fatima P Mina
(74) *Attorney, Agent, or Firm* — Fletcher Yoder, P.C.

(57) ABSTRACT

In some examples, a system stores, in a first database having a first schema, metrics received from a network comprising communication nodes, the metrics relating to operations of the communication nodes, and the first database associating the metrics with metadata corresponding to hierarchical components in a topology of the network. In response to an alert relating to an issue in the network, the system computes a health measure based on the metrics, the health measure indicating a health status of a first component, performs a dynamic runtime mapping of the metadata associated with the metrics in the first database having the first schema with corresponding metadata in a second database having a second schema different from the first schema, where the second database contains information of a topology of the network, and initiates a management action to address the health status based on the health measure and the dynamic runtime mapping.

14 Claims, 4 Drawing Sheets

(56) References Cited

U.S. PATENT DOCUMENTS

| | | | |
|---|---|---|---|
| 2016/0225028 A1* | 8/2016 | Rollert | G07C 13/00 |
| 2018/0375748 A1* | 12/2018 | Russell | H04L 43/08 |
| 2020/0358702 A1 | 11/2020 | Agrawal et al. | |
| 2022/0116266 A1 | 4/2022 | Strater et al. | |
| 2022/0404810 A1* | 12/2022 | Amaro, Jr. | G05B 19/41835 |

* cited by examiner

HEALTH-BASED MANAGEMENT OF A NETWORK

BACKGROUND

A network can include communication nodes arranged in a given topology to allow for communications by endpoint devices coupled to the network. The communication nodes can include switches or routers or other types of devices that forward data across a network.

BRIEF DESCRIPTION OF THE DRAWINGS

Some implementations of the present disclosure are described with respect to the following figures.

Figure 1:
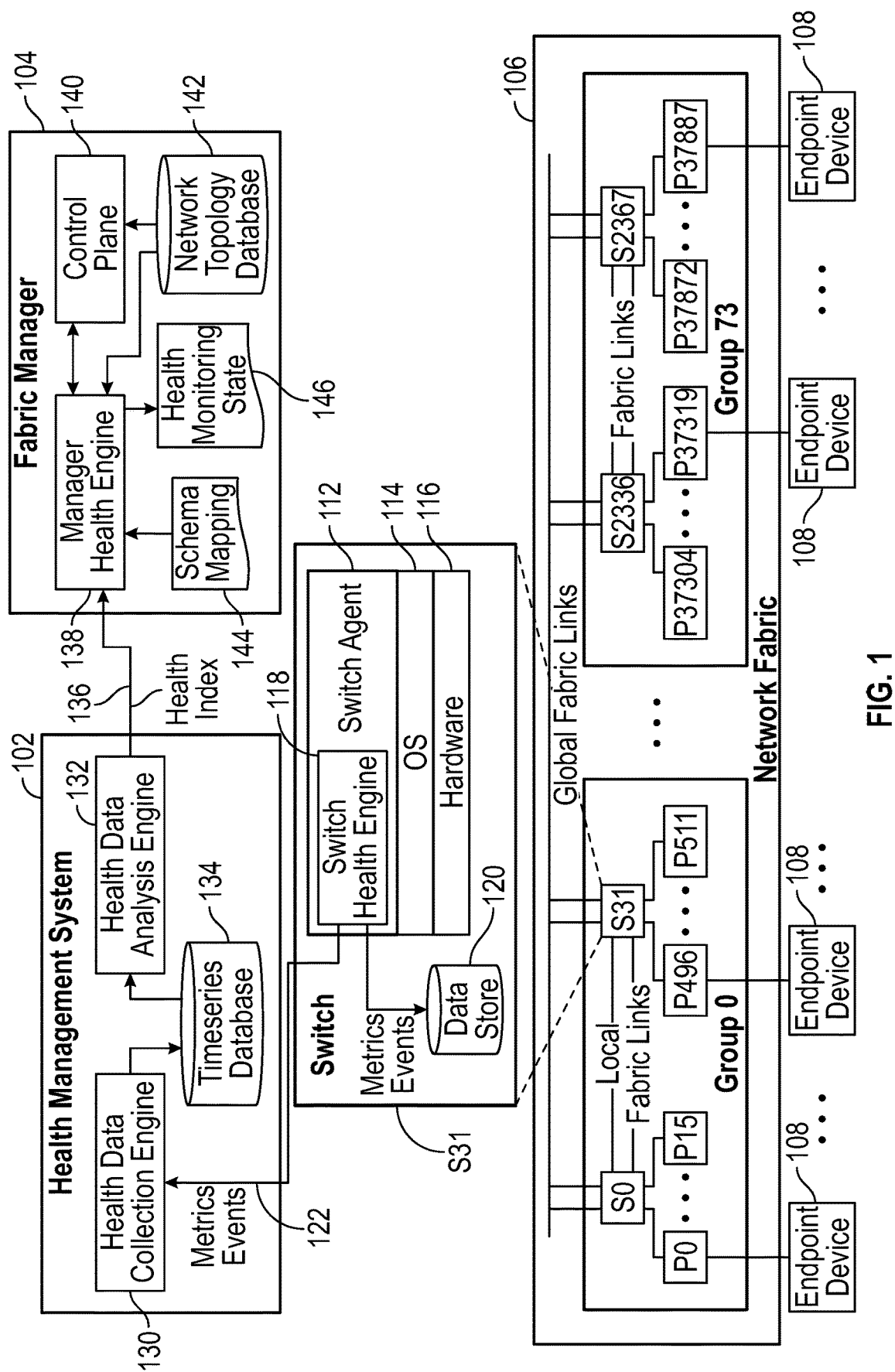
FIG. 1 is a block diagram of an arrangement that includes a health management system, a fabric manager, and communication nodes, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A large network can include a large quantity of communication nodes, with each communication node having a quantity of ports. The health of a network is related to the health and proper functioning of components of the network, including the communication nodes, the ports of the communication nodes, and other resources of the communication nodes. As an example, if a port is exhibiting a faulty behavior, then a communication node would not be able to reliably communicate data through the faulty port. As another example, resources such as hardware (e.g., a processor, a controller, a memory device, an input/output (I/O) device, etc.) and/or machine-readable instructions (e.g., software or firmware) in a communication node may also exhibit faulty behavior, which may cause the communication node to not be able to reliably operate.

Health management systems can be employed to monitor the health of components in a network, such as by collecting metrics associated with operations of communication nodes (e.g., operations involving the forwarding of data by communication nodes along links connected to the communication nodes). As the overall quantity of components that are present in a network increases, the quantity of metrics to be monitored and analyzed can also increase. The quantity of metrics to be monitored and analyzed can present a scaling problem where if the quantity of metrics to be monitored becomes too large, a health management system may not be able to identify issues and trigger management actions to address the issues in a timely manner. A delay in the triggering of management actions as issues are encountered can lead to errors or other failures in communications between endpoint devices that are coupled to the network.

Further, collecting and analyzing a large quantity of metrics can place greater processing, storage, and communication burdens on a health management system. Increasing processing resources (e.g., adding more computer systems and/or using computer systems with greater processing capacities), increasing communication resources (e.g., adding more network interface controllers and/or using network interface controllers with greater communication capabilities), and/or increasing storage resources (e.g., adding additional storage devices and/or using storage devices with greater storage capacities) in a health management system as the size of a network and the quantity of metrics to be monitored and analyzed are increased can add to the overall cost of the health management system.

In accordance with some implementations of the present disclosure, health-based network management techniques or mechanisms are provided that employ multiple databases according to different schemas to store different types of information relating to health monitoring and management. The use of the multiple databases according to different schemas allows for more efficient maintenance of information relating to metrics being collected and information relating to a topology of a network, such that the databases can be kept at manageable sizes. If a common database were to be employed to store both metrics and network topology information, the database may become too large as a large quantity of metrics would have to be correlated to different components of the network in the same database.

Also, for more efficient usage of resources, a system can collect metrics at a first, slower sampling rate until issues in the network are encountered. In response to detecting an issue in the network, the system triggers the collection of additional metrics at a second, higher sampling rate. In this way, prior to the occurrence of network issue(s), a first set of metrics is collected at a lower sampling rate to reduce the amount of metric data that have to be communicated and stored, which results in more efficient usage of resources. After the occurrence of network issue(s), a second set of metrics is collected at a higher sampling rate, where the second set of metrics includes additional metric(s) not included in the first set. Collecting more metrics at a higher sampling rate provides more information that can be used by the system to address the network issue(s). More generally, the additional metrics can be collected at a different sampling rate (either higher than or lower than the first sampling rate), or even at the same sampling rate as the first sampling rate.

In some examples, a first database having a first schema is used to store metrics received from communication nodes of a network, where the metrics relate to operations of the communication nodes. A second database contains information of a topology of the network, where the second database has a second schema that is different from the first schema. The first schema is tailored to efficiently store metrics that are collected over time. The second schema is tailored to efficiently store network topology information. Examples of the first schema and the second schema and how a runtime mapping can be performed between the first and second schema are discussed further below.

In response to an alert relating to an issue in the network, the system can perform dynamic runtime mapping of metadata associated with metrics in the first database having the first schema with corresponding metadata in the second database having the second schema, and based on such dynamic runtime mapping, the system can initiate a management action to address network issue(s).

In some examples, the first schema of the first database is a timeseries schema. A database according to a timeseries schema stores data as a sequence of data values in corresponding time intervals. The database according to the timeseries schema can also store tags that associate the data values with respective components of a network. Metrics relating to operations of communication nodes are collected over time to form a time series that includes metric values in corresponding time intervals. The time series of metric values can be efficiently stored in the first database according to the timeseries schema.

In some examples, the second schema of the second database can be any of a relational schema, a graph-based schema, or a document-based schema. A database according to a relational schema stores data in relational tables. A relational table is arranged as rows and columns, where each row includes multiple fields (columns) that are related in some way. A network topology can be represented using various fields that represent components and how the components are related to one another. These fields representing the components of the network topology can be stored as columns in one or more relational tables. The fields of relational database can also include fields relating to runtime state information of components (discussed further below). The relations among the components and runtime state information represented by the fields in the relational table(s) can correspond to the topology of the components in the network (e.g., a communication node includes certain ports, a group includes certain communication nodes, a port includes certain lanes, etc.). The components in the network are hierarchical components in the network topology, i.e., the components can be at different levels of a hierarchy of the network topology. For example, the hierarchical levels can include the following in descending hierarchical level: Level 1: a group of communication nodes; Level 2: communication nodes; Level 3: ports and links; Level 4: lanes of a link.

The relational schema can allow network topology and associated runtime state information to be stored for network components while reducing or avoiding duplication of data. Database queries can be submitted to retrieve data from a relational table and to insert or update data in a relational table. Database queries can also be submitted to perform database operations involving multiple relational tables, such as joins of the multiple relational tables. Examples of database queries include Structured Query Language (SQL) queries.

A database according to a graph-based schema stores data in graph form. For example, a graph can include graph nodes that are interconnected by graph links. To represent a network topology, the graph nodes can represent components of the network topology, such as communication nodes (e.g., switches or routers or other types of communication devices), ports of a communication node, lanes of a port, resources in a communication node (e.g., hardware resources such as processors, controllers, memory devices, etc., or program resources such as an operating system (OS), an application program, firmware, etc.), groups of communication nodes, and so forth. The graph links between the graph nodes can represent relationships between the components according to a network topology. A graph-based schema is useful to provide a natural representation of the connectivity of components in a network topology.

A database according to a document-based schema stores data in a document according to a specified document structure that contains data of various data types with relationships between the data of various data types. The database may include multiple documents, and each document can uniquely represent a respective single component in a network. For example, every switch can be represented by a respective document, every port can be represented by a respective document (with a field that indicates whether the port is an edge port or a fabric port-edge and fabric ports are discussed further below)), and every group of switches can be represented by a respective document (that includes references to the switches that are part of the group).

Metrics can be collected by sensors (including hardware sensors or sensors implemented with machine-readable instructions) at the switches. Metrics can also be collected by a processing resource of a switch.

FIG. 1 is a block diagram of an example arrangement that includes a health management system 102, a fabric manager 104, and switches S0 to S2367. Although a specific quantity of switches is depicted in FIG. 1, it is noted that a different quantity of switches can be deployed in other examples. The switches of FIG. 1 are examples of communication nodes.

The switches are part of a network fabric 106 (also referred to simply as a "network") that can allow endpoint devices 108 coupled to the network fabric 106 to communicate with one another. Examples of endpoint devices 108 can include any or some combination of the following: desktop computers, notebook computers, tablet computers, server computers, storage systems, household appliances, game appliances, wearable devices, Internet of Things (IoT) devices, and so forth.

The health management system 102 can be implemented using a collection of computers. As used here, a "collection" of items can refer to a single item or multiple items. Thus, the collection of computers used to implement the health management system 102 can include a single computer or multiple computers. Similarly, the fabric manager 104 can be implemented using a collection of computers. Although FIG. 1 shows an example in which the health management system and the fabric manager 104 are distinct elements, in other examples, the health management system 102 and the fabric manager 104 can be integrated together.

Each switch includes a number of edge ports that are to connect to respective endpoint devices 108 over corresponding links. An "edge port" refers to a port at an edge of a network to which an endpoint device can connect. A "link" can refer to a communication medium (wired and/or wireless) over which devices can communicate with one another.

In the example of FIG. 1, the switch S0 includes edge ports P0 to P15, the switch S31 includes edge ports P496 to P511, the switch S2336 includes edge ports P37304 to P37319, and the switch S2367 includes edge ports P37872 to P37887. In the example of FIG. 1, each switch includes 16 edge ports. In other examples, a switch can include a different quantity of edge ports, and different switches may include different quantities of edge ports.

In addition to edge ports to connect to endpoint devices, each switch also includes fabric ports to connect to other switches. The fabric ports of a switch can include fabric ports to connect to local fabric links and global fabric links. Local fabric links refer to links that interconnect switches within a group of switches. FIG. 1 shows an example with Group 0 and Group 73, where Group 0 includes switches S0 to S31, and Group 73 includes switches S2336 to S2367. In other examples, switches are not divided into groups.

Global fabric links refer to links that interconnect switches in different groups. For example, switches S0 to S31 in Group 0 are interconnected by global fabric links to switches S2336 to S2367 in Group 73.

In some examples, a link can include multiple lanes. A "lane" of a link refers to a communication channel, such as implemented using electrical conductors or optical fiber or wireless channels, over which signals can be communicated. A link can be implemented as an aggregate of multiple lanes, to provide increased throughput over the link. Thus, data can be communicated in parallel across the lanes between devices, such as between an endpoint device and an edge port, or between switches over a local fabric link or a global fabric link.

Further details of the switch S31 are shown in FIG. 1. The other switches can include a similar arrangement of components. The switch S31 includes a switch agent 112 that interacts with the fabric manager 104. This switch S31 also includes an operating system (OS) 114, as well as any drivers associated with the OS 114. The switch S31 further includes hardware 116, such as physical ports (e.g., edge ports and fabric ports), a collection of processors, a collection of memory devices, a collection of persistent storage devices, a collection of input/output (I/O) devices, and so forth. The switch agent 112 and the OS 114 (and any associated drivers) are implemented using machine-readable instructions executable on the collection of processors in the hardware 116.

The switch agent 112 includes a switch health engine 118 that is used to monitor the health of the switch S31. An "engine" can refer to machine-readable instructions executable on hardware processing circuitry. Hardware processing circuitry can include any or some combination of a microprocessor, a core of a multi-core microprocessor, a microcontroller, a programmable integrated circuit, a programmable gate array, or another hardware processing circuit.

The switch health engine 118 collects metrics of the switch S31. Examples of metrics of a switch S31 that can be monitored by the switch health engine 118 can include any or some combination of the following: an error rate of a port or link, a status of a port (e.g., active, inactive, etc.), an indication of congestion of the switch S31 (e.g., queues in the switch S31 have filled up over a threshold amount), bandwidth usage of a port, quantity of data units discarded or dropped by a switch, and so forth.

In some examples, the switch health engine 118 can store collected metrics in a data store 120 of the switch S31, for use by the switch S31 locally. The data store 120 can be implemented using a collection of storage devices, such as disk-based storage devices, solid state drives, memory devices, and so forth. The switch health engine 118 can also transmit (at 122) metrics to the health management system 102.

Additionally, the switch health engine 118 is able to generate events based on sampled metrics by the switch health engine 118. Events may also be based on hardware events such as a cable reseat, or another hardware event. Events are asynchronously sent as the events occur. The switch health engine 118 can store events in the data store 120. An "event" refers to a notification that is generated when specified condition(s) occur. An event that is indicative of an issue with the switch S31 or a link connected to the switch S31 produces an alert. Thus, an alert is a special type of event with some indicator (e.g., a flag in the alert) that an issue has occurred. For example, if an error rate exceeds a first threshold, the switch health engine 118 can generate an event. At this point, although errors have been experienced on a port or link, such errors may not adversely affect operations of the switch S31. However, if the error rate exceeds a second threshold (that is greater than the first threshold), then the switch health engine 118 generates an alert, since at this point the errors experienced on the port or link may result in faulty operation of the switch S31.

In further examples, the switch health engine 118 can compare metrics collected by the switch health engine 118 to other criteria for the purpose of determining whether or not to issue a respective alert. For example, if congestion is experienced in the switch S31, the switch health engine 118 can compare the congestion level to a threshold for the purpose of determining whether or not to issue an alert. Also, the switch health engine 118 can compare usage of bandwidth to a threshold; if the bandwidth usage exceeds a threshold, then an alert can be issued.

Alerts can also be generated for other issues, such as optical link instability, errors in a hardware or program resource of a switch, and so forth. For example, optical link instability may be present if an optical link connected to a switch port experiences an optical link flapping event which takes the optical link down momentarily.

Each switch in the network fabric 106 performs local processing of metrics (and more specifically, events) to generate alerts where appropriate. The events stored in the data store 120 can include events that have not risen to the level of alerts, as well as alerts.

The switch health engine 118 can also add metadata to an alert to indicate a criticality of the alert. For example, the criticality of an alert can be categorized as informational (which indicates that the alert is issued for informational purposes and no action has to be taken), minor (which indicates that the alert would not adversely affect network operations), major (which indicates that failure to address the issue of the alert may cause degradation in network performance), or critical (which indicates that failure in the network fabric has occurred or is imminent). The criticality of an alert can be used in deciding management actions to take.

More generally, alerts can be generated by the switch health engine 118 according to rules configured at the switch health engine 118. The rules can be dynamically updated in some examples.

The switch health engine 118 can send (at 122) metrics and events (including alerts) alerts to the health management system 102. The health management system 102 includes a health data collection engine 130 to receive metrics and events from the switch health engine 118 in each switch of the network fabric 106.

The health data collection engine 130 receives metrics and alerts from the switch health engine 118 in each switch of the network fabric 106. In some examples, the switch health engine 118 can push metrics and alerts to the health data collection engine 130. In other examples, the health data collection engine 130 can request metrics and events from the switch health engine 118.

In accordance with some implementations of the present disclosure, the health data collection engine 130 stores metrics and events in a timeseries database 134. The timeseries database 134 can be stored in a collection of storage devices of the health management system 102.

The health management system 102 further includes a health data analysis engine 132. The health data analysis engine 132 retrieves metrics and events from the timeseries database 134 (or multiple timeseries databases), and performs an analysis on the metrics and events. Although depicted as separate modules, the health data collection engine 130 and the health data analysis engine 132 can be integrated into a common module.

Prior to occurrence of an alert, a first collection of metrics is sent by the switch health engine 118 to the health data collection engine 130 at a first sampling rate. A "sampling rate" refers to a rate at which metrics are collected (sampled). At the first sampling rate, a collection of metrics can be sent from the switch health engine 118 to the health data collection engine 130 every first time interval. Events are sent by the switch health engine 118 asynchronously to the health data collection engine 130 as the events occur.

In response to an alert from the switch health engine 118, the health data collection engine 130 can request the switch health engine 118 to acquire a second collection of metrics at a second sampling rate that may be the same as or different from (e.g., greater than or less than) the first sampling rate. The second collection of metrics can include one or more additional metrics not present in the first collection of metrics. The second collection of metrics may further include some or all of the metrics of the first collection of metrics. The switch health engine 118 of the switch S31 can continue to send the second collection of metrics at the higher sampling rate to the health data collection engine 130 until the issue associated with the alert is resolved, which can be indicated by the health management system 102. Alternatively, the switch health engine 118 of the switch S31 can continue to send the second collection of metrics at the higher sampling rate to the health data collection engine 130 until a remediation action is initiated (e.g., by the fabric manager 104), at which point metrics are obtained at a lower sampling rate.

As an example, if a link error rate (an example of a first metric) exceeds a threshold, the switch health engine 118 can send a respective alert to the health management system 102. In response to the alert, the health data collection engine 130 can determine that the switch S31 employs multiple lanes per link. Based on this determination, the health data collection engine 130 can issue a request to the switch health engine 118 to collect lane error rates for the respective lanes of the link that has experienced the elevated link error rate. The additional metrics (including lane error rates) that are collected at the higher second sampling rate are received by the health data collection engine 130 and further stored in the timeseries database 134 or another timeseries database to provide feedback of the additional metrics to the health data analysis engine 132.

As a further example, an alert can include metadata indicating a component in the network fabric 106 having an issue. The metadata can include an identifier of the component or a type of the component. The health data collection engine 130 can access information associating a list of metrics with the component (or the component type). The health data collection engine 130 can identify one or more metrics to collect based on the list of metrics, and the health data collection engine 130 can trigger the collection of the additional metrics based on the identified one or more metrics.

In some examples, to store the additional metrics of the second collection of metrics, the health data collection engine 130 can create another timeseries database having a timeseries schema different from the timeseries schema of the existing timeseries database 134. Some additional metrics may relate to additional components of the network. The different timeseries schema that is created at runtime is to accommodate metrics and components that may not be present in the original timeseries database.

The health data analysis engine 132 retrieves events from the timeseries database 134 and associated metrics. The metrics retrieved can include the second collection of metrics sent by the switch health engine 118 at the higher second sampling rate. For an alert, the health data analysis engine 132 computes a health measure based on the metrics associated with the alert. As an example, if the alert relates to a link experiencing an elevated link error rate (i.e., greater than a threshold), then the metrics associated with this alert includes error rates of the link, as well as any error rates of the lanes of the link.

In some examples, the health measure computed by the health data analysis engine 132 is a health index, which is based on a combination of multiple metrics. For example, a health index can be computed for a port of the switch S31 connected to the link with the elevated link error rate. The health index for the port can be based on the following metrics, for example: a link error rate of the link, lane error rates of the lanes of the link, a bandwidth usage of the port, and so forth. In some examples, the health index can be a weighted sum of multiple metrics, such as according to the following:

$$\text{Health\_Index} = w_1 m_1 + w_2 m_2 + \ldots + w_k m_k,$$

where k≥2, and $w_i$ (i=1 to k) represents a weight associated with metric mi. The weights can be predefined or dynamically set.

As another example, a health index can be computed by the health data analysis engine 132 for the switch S31, which can be based on various metrics associated with the switch S31, such as error rates of ports or links connected to the switch S31, a status of each port, an indication of congestion of the switch S31, bandwidth usages of the ports, and so forth.

As a further example, a health index can be computed by the health data analysis engine 132 for a group of switches. Such a health index is based on metrics collected for the switches in the group.

More generally, a health index is a cumulative representation of multiple metrics and associated weights to indicate a health of a component (e.g., a port, a link, a switch, a group of switches, etc.) in the network fabric 106. The health index represents a health status associated with a component. Different values of the health index may indicate different health statuses—e.g., a first health index value can indicate that the component is healthy and functioning as intended, a second health index value may indicate that the component is operating at less than a target threshold, a third health index value may indicate that the component is approaching a condition that may result in failure or fault of the component, and a fourth health index value may indicate that the component has experienced a failure or fault. The health data analysis engine 132 sends (at 136) the computed health index to a manager health engine 138 in the fabric manager 104.

The manager health engine 138 uses the health index to determine a management action to trigger to address the issue of the alert associated with the health index. In some examples, the manager health engine 138 can compare a value of the health index to a health index threshold. If the value of the health index has a specified relationship with respect to the health index threshold (e.g., the health index value exceeds the health index threshold, or the health index value is less than the health index threshold, etc.), the manager health engine 138 can trigger the management action. If the value of the health index does not have the specified relationship with respect to the health index threshold, the manager health engine 138 may not trigger the management action.

The management action can include a collection of remediation actions to address the issue, including any or some combination of the following: adjusting the forwarding of data units (e.g., data packets, data frames, etc.) by a switch or group of switches, setting a port to an inactive state, sending an alert to an administrator, and so forth.

The management action can be taken by a control plane 140 of the fabric manager 104. For example, the manager health engine 138 in the fabric manager 104 can notify the control plane 140 of the management action to take, and the control plane 140 can implement the management action by instructing the switch S31 to perform certain actions.

In response to the management action, metrics collected by the switch health engine 118 can start to change (e.g., a link error rate and/or lane error rate may decrease). The changed metrics will cause the corresponding health index value computed by the health data analysis engine 132 to change. If the manager health engine 138 determines from the changed health index that the issue has been resolved, the manager health engine 138 can instruct the switch health engine 118 to reduce the sampling rate at which metrics are collected, and also to reduce the quantity of metrics collected (e.g., the switch health engine 118 can stop collecting lane error rates). Alternatively, the sampling rate can be reduced in response to the issue being identified. In one example, automated feedback is provided in which metrics collected after a management action is implemented can allow the health management system 102 and the fabric manager 104 to determine that the health of switch(es) in the network fabric 106 has improved.

The control plane 140 of the fabric manager 104 can be implemented using hardware processing circuitry and machine-readable instructions executable on the hardware processing circuitry. Control plane actions that can be performed by the control plane 140 include any or some combination of the following: loading or updating forwarding information in each of the switches of the network fabric 106 to control the forwarding of data units through the network fabric 106, activating or deactivating ports or lanes of links, setting up or configuring switches, and so forth.

Forwarding information used by a switch can be in the form of a forwarding table that maps network addresses to respective interfaces (edge ports or fabric ports) of the switch based on network addresses contained in data units. The switch can use the forwarding table to forward data units based on network addresses (such as Media Access Control (MAC) addresses) in the data units. In examples where the network fabric 106 includes routers, network addresses can be in the form of Internet Protocol (IP) addresses.

As noted above, a management action that can be triggered by the manager health engine 138 in response to a health index can include adjusting the forwarding of data units by a switch. To do so, the control plane 140 can update the forwarding table of the switch.

The fabric manager 104 also stores a network topology database 142 to store information regarding a network topology of the network fabric 106. The network topology database 142 has a schema that differs from the timeseries schema of the timeseries database 134. For example, the schema of the network topology database 142 can be a relational schema, a graph-based schema, a document-based schema, and so forth. The control plane 140 uses the network topology information in the network topology database 142 to perform control plane actions with respect to the switches in the network fabric 106.

The network topology database 142 can store information of the components in the network fabric 106, including switches, ports of switches, links connected to switch ports, groups of switches, resources in switches, and so forth. Additionally, the network topology database 142 can store runtime state information relating to the components of the network fabric 106. Runtime state information contained in the network topology database 142 can include any or some combination of the following: port policies associated with ports of each switch (e.g., port policies can include a policy relating to usage of a virtual local area network (VLAN) by the port, a policy relating to link aggregation (LAG) by the port in which multiple links are aggregated together, etc.), a type of each port (e.g., an edge port that is to connect to an endpoint device, a local fabric port that is to connect over a local fabric link to another switch in the same group of switches, or a global fabric port that is to connect over a global fabric link to a switch in another group of switches), configuration state data that is used for setting up a switch during startup of the switch, and so forth.

In accordance with some implementations of the present disclosure, the manager health engine 138 in the fabric manager 104 can perform a dynamic runtime mapping between the timeseries schema of the timeseries database 134 and the schema of the network topology database 142. The dynamic runtime mapping is performed based on schema mapping information 144 stored at the fabric manager 104, such as in a memory of the fabric manager 104.

A dynamic runtime schema mapping is used to associate data according to the timeseries schema to data according to the schema (e.g., a relational schema, a graph-based schema, a document-based schema, etc.) used by control plane 140.

Figure 2:
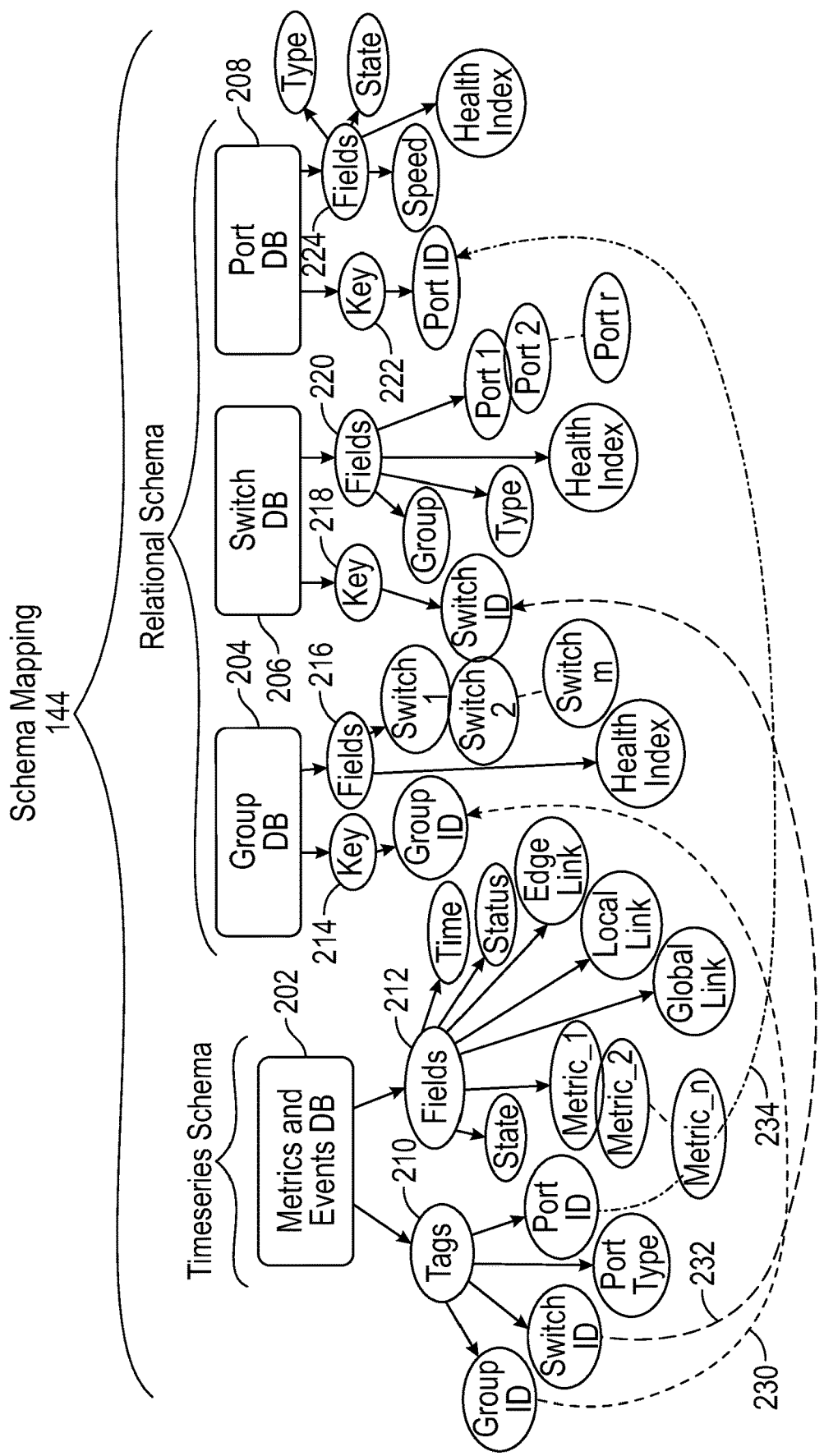
FIG. 2 is a graph showing a mapping between schemas for a timeseries database and a relational database, according to some examples.

An example of the schema mapping information 144 is shown in FIG. 2. The schema mapping information 144 shows a mapping between data of a metrics and events database 202 according to the timeseries schema and data of a group database 204, a switch database 206, and a port database 208 each of which is according to the relational schema. The metrics and events database 202 is an example of the timeseries database 134 of FIG. 1, and the group database 204, the switch database 206, and the port database 208 collectively form an example of the network topology database 142 of FIG. 1.

The timeseries schema includes metadata (in the form of tags 210) and fields 212. The fields 212 include various metrics (e.g., metric_1, metric_2, . . . , metric_n) and other fields such as Global link (to indicate that a link is a global fabric link), Local link (to indicate that a link is a local fabric link), an Edge link (to indicate that a link is an edge link), Status (to indicate a status of a component), Time (to indicate a time that a metric was collected), State (to indicate a state of a component), and so forth. The fields have values that are collected with metrics and events received from the switch health engine 118.

The tags 210 of the timeseries schema include Group ID (to identify a group), Switch ID (to identify a switch), Port ID (to identify a port), and Port Type (to identify a type of a port, such as an edge port, a local port, or a global port). The metrics and events collected by the switch health engine 118 can include metadata in the form of the tags 210, so that the metrics and events can be associated with a group, a switch, a port, or a port type, as examples.

Each of the group database 204, the switch database 206, and the port database 208 includes a key and fields (which are columns that can be contained in relational tables). A "key" refers to an attribute (e.g., one or more of the columns of each relational table) that can be used to identify a respective row of the relational table.

The group database 204 has a key 214 that includes Group ID (to identify a group). A relational table in the group database 204 includes rows that can be separately identified by a value of Group ID. The group database 204 includes fields 216 that include Switch 1, Switch 2, . . . , Switch m (m≥2), which represent identifiers of switches in the group identified by a corresponding value of Group ID. The fields 216 further include a Health Index, which is a health index computed by the health data analysis engine 132 (FIG. 1) for each group of switches. For example, a row of a relational table in the group database 204 can include the following columns: Group ID (which is the key of the relational table and identifies a respective group of switches), Switch 1, Switch 2, . . . , Switch m (m≥2) (to identify the switches in the respective group of switches identified by the value of Group ID in the row), and Health Index (which is the health index for the respective group of switches).

The switch database 206 has a key 218 that includes Switch ID (to identify a switch). Fields 220 of the switch database 206 include Group (to contain a value identifying which group a switch is part of), Type (to indicate the type of switch), Health Index (which is the health index for the switch), and Port 1, Port 2, . . . , Port r (r≥2) (which represent identifiers of ports in the switch identified by a corresponding value of Switch ID). For example, a row of a relational table in the switch database 206 can include the following columns: Switch ID (which is the key of the relational table and identifies a respective), Port 1, Port 2, . . . , Port r (r≥2) (to identify the ports in the respective switch identified by the value of Switch ID in the row), and Health Index (which is the health index for the respective switch).

The port database 208 has a key 222 that includes a Port ID (to identify a port). Fields 224 of the port database 208 include Speed (which indicates a maximum communication rate supported by a port), Type (to indicate the type of a port), State (to indicate a state of a port), and Health Index (which is the health index for the port). For example, a row of a relational table in the port database 208 can include the following columns: Speed (which indicates a maximum communication rate supported by a respective port identified by the value of Port ID in the row), Type (to indicate the type of the respective port), State (to indicate a state of the respective port), and Health Index (which is the health index for the respective port).

The dynamic runtime mapping between the time series schema and the database schema shown in FIG. 2 can be based on the tags 210 of the timeseries schema, where the tags 210 correspond to respective keys in the relational schema. For example, a runtime mapping 230 can be determined between the Group ID tag of the metrics and events database 202 and the Group ID key of the group database 204, a runtime mapping 232 can be determined between the Switch ID tag of the metrics and events database 202 and the Switch ID key of the switch database 206, and a runtime mapping 234 can be determined between the Port ID tag of the metrics and events database 202 and the Port ID key of the port database 208.

Based on the dynamic runtime mapping between data of the metrics and events database 202 and data of the relational databases 204, 206, and 208, the manager health engine 138 in the fabric manager 104 (FIG. 1) can use values of the tags 210 included with the metrics and events (including alerts) of the metrics and events database 202 to identify the components of the network fabric 106 affected by the metrics and events.

For example, an alert and metrics associated with the alert can include a specific value of Group ID (e.g., Group ID-1 to identify a specific group of switches), specific values of Switch ID (e.g., Switch ID-X and Switch ID-Y that identify two respective switches in the group identified by Group ID-1), and specific values of Port ID (e.g., Port ID-X1 and Port ID-X5 which are ports in the switch identified by Switch ID-X, and Port ID-Y2 and Port ID-Y7 which are ports in the switch identified by Switch ID-Y). The foregoing tag values (including Group ID-1, Switch ID-X, Switch ID-Y, Port ID-X1, Port ID-X5, Port ID-Y2, and Port ID-Y7) can be used by the manager health engine 138 to identify corresponding rows of relational tables in the group database 204, the switch database 206, and the port database 208 that contain information pertaining to the affected components. By being able to associate alerts and metrics with network topology components in different types of databases according to different database schemas, the manager health engine 138 is able to determine the management action to be performed with respect to the network topology components (e.g., the manager health engine 138 can determine that routing tables in affected switches should be updated to avoid certain ports or links when forwarding data units).

In some examples, the manager health engine 138 of the fabric manager 104 can generate health monitoring state information 146 that can include the following information: a list of alert(s) for which the manager health engine 138 has triggered management action(s), information of component(s) affected by the list of alert(s), health index(es) of components affected by the list of alert(s), the management action(s). In some examples, the health monitoring state information 146 is stored in a document according to a document-based schema; the document contains a unique document identifier that identifies the document. Multiple instances of the health monitoring state information 146 can be generated by the manager health engine 138 for respective different collections of alerts. Each instance of the health monitoring state information 146 can be stored in a corresponding separate document.

In accordance with some examples of the present disclosure, an event-based approach for taking health management actions for components of a network fabric allows scaling of the approach for large network fabrics. A smaller collection of metrics can be obtained at a lower sampling rate until alerts are issued, at which point a larger collection of metrics can be obtained at a higher sampling rate, which reduces resource usage in health management of network fabrics and thus allows for the health management to process data for a larger quantity of components and to respond in a more timely manner. The health management approach according to some examples of the present disclosure is adaptable and flexible by being able to monitor for alerts using metrics collected at a coarser grain, and then triggering a finer grain collection of metrics when alerts are received.

Additionally, the health management approach according to some examples of the present disclosure employs both localized processing (by the switch health engines 118 in the switches of the network fabric) as well as global processing (by the health management system 102 and the fabric manager 104). Such parallel processing by the switches and the health management system 102 and the fabric manager 104 can leverage processing resources of a larger pool of systems in performing health management.

Figure 3:
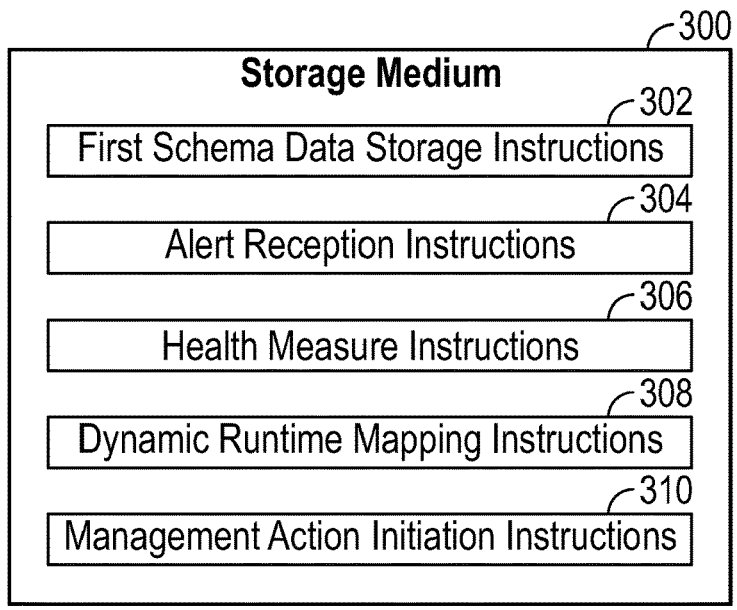
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can include the health management system 102 and/or the fabric manager 104 of FIG. 1, for example.

The machine-readable instructions include first schema data storing instructions 302 to store, in a first database having a first schema, metrics received from a network including communication nodes. The metrics relate to operations of the communication nodes, and the first database associating the metrics with metadata corresponding to hierarchical components in a topology of the network. The first schema can be a timeseries schema. The communication nodes can include switches. The hierarchical components can include groups of communication nodes, communication nodes, and ports of communication nodes.

The machine-readable instructions include alert reception instructions 304 to receive an alert relating to an issue in the network. The alert can be an event generated based on local processing at a communication node, such as by the switch health engine 118 in the switch S31 of FIG. 1.

The machine-readable instructions include the instructions 306, 308, and 310 to perform actions in response to the alert. Health measure instructions 306 compute a health measure based on the metrics, the health measure indicating a health status of a first component. For example, the health measure can be a health index based on a combination of multiple metrics.

Dynamic runtime mapping instructions 308 perform a dynamic runtime mapping of the metadata associated with the metrics in the first database having the first schema with corresponding metadata in a second database having a second schema different from the first schema, where the second database contains information of the topology of the network. The metadata associated with the metrics in the first database includes tags, such as the tags 210 of FIG. 2. The metadata in the second database can include keys, such as the keys 214, 218, and 222 of FIG. 2. In some examples, the dynamic runtime mapping instructions 308 can perform the dynamic runtime mapping based on correlating one or more tags associated with the metrics in the first database with corresponding one or more keys associated with components of the network in the second database.

Management action initiation instructions 310 initiate a management action to address the health status based on the health measure and the dynamic runtime mapping. The management action can be requested by the manager health engine 138 in the fabric manager 104 of FIG. 1, for example, and the management action can be implemented by the control plane 140 of the fabric manager 104, for example, based on interaction between the control plane 140 and the switch agent 112 of a switch.

In some examples, in response to the alert, the machine-readable instructions trigger a collection of additional metric data at a sampling rate that is greater than a sampling rate at which metrics were originally collected. The health measure is further based on the additional metric data.

In some examples, the machine-readable instructions create, at runtime, a schema to store the additional metric data.

In some examples, the machine-readable instructions store, as feedback, the additional metric data in the first database having the first schema or another database having a different schema.

In some examples, the machine-readable instructions identify a component of the network for which the management action is to be applied based on the dynamic runtime mapping.

In some examples, the alert and the metrics contain values of the tags, and the machine-readable instructions identify entries of the second database using the values of the tags, the identified entries of the second database including information of one or more components impacted by the issue.

Figure 4:
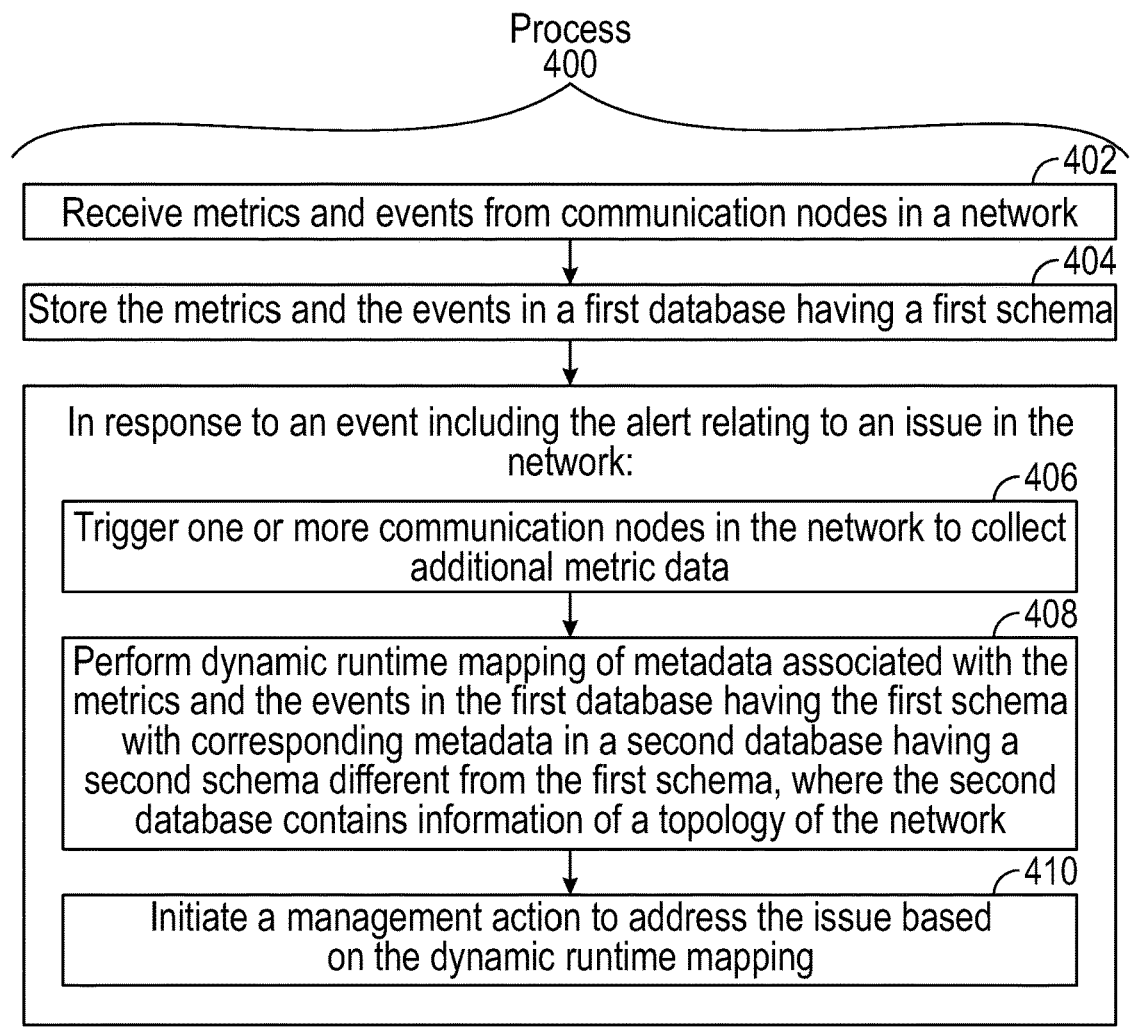
FIG. 4 is a flow diagram of a process according to some examples.

FIG. 4 is a flow diagram of a process 400 according to some examples. The process 400 can be performed by a system, such as the health management system 102 and/or the fabric manager 104 of FIG. 1, for example.

The process 400 includes receiving (at 402) metrics and events from communication nodes in a network. The events are generated by the communication nodes based on local processing of the metrics at the communication nodes. The events can include an alert that is based on a determination by a communication node that metric values exceed a threshold.

The process 400 includes storing (at 404) the metrics and the events in a first database having a first schema. In some examples, the first schema is a timeseries schema.

The process 400 includes performing tasks 406, 408, and 410 in response to an event including the alert relating to an issue in the network. The task 406 triggers one or more communication nodes in the network to collect additional metric data. The additional metric may be part of a second collection of metrics obtained at a greater sampling rate than a first collection of metrics obtained prior to the alert.

The task 408 performs dynamic runtime mapping of metadata associated with the metrics and the events in the first database having the first schema with corresponding metadata in a second database having a second schema different from the first schema. The second database contains information of a topology of the network.

The task 410 initiates a management action to address the issue based on the dynamic runtime mapping. The management action can be initiated based on a health index having a specified relationship with a health index threshold, for example.

Figure 5:
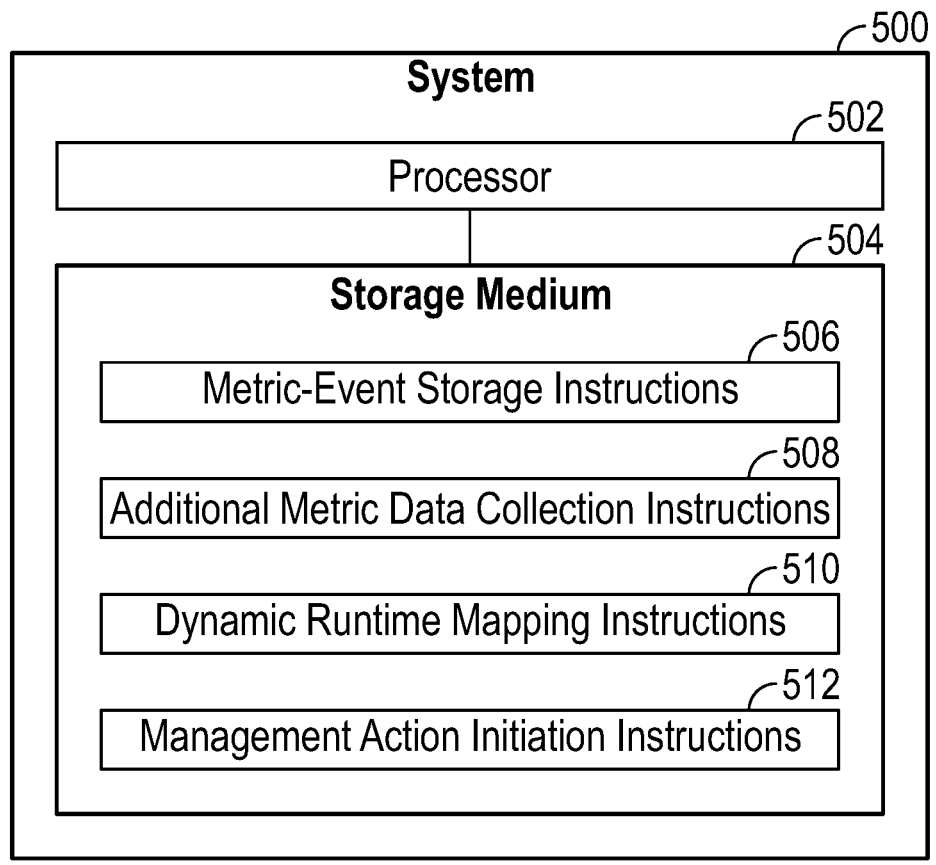
FIG. 5 is a block diagram of a system according to some examples.

FIG. 5 is a block diagram of a system 500 that includes a processor 502 (or multiple processors). A processor can include a microprocessor, a core of a multi-core microprocessor, a microcontroller, a programmable integrated circuit, a programmable gate array, or another hardware processing circuit.

The system 500 includes a storage medium 504 storing machine-readable instructions executable on the processor 502 to perform various tasks. Machine-readable instructions executable on a hardware processor can refer to the instructions executable on a single hardware processor or the instructions executable on multiple hardware processors.

The machine-readable instructions in the storage medium 504 include metric-event storage instructions 506 to store metrics and events received from communication nodes in a network in a first database having a timeseries schema.

The machine-readable instructions in the storage medium 504 include instructions 508, 510, and 512 that are performed in response to an event comprising an alert relating to an issue in the network.

Additional metric data collection instructions 508 trigger one or more communication nodes in the network to collect additional metric data. The additional metric data can be part of a second collection of metrics obtained at a greater sampling rate than a first collection of metrics obtained prior to the alert.

Dynamic runtime mapping instructions 510 perform dynamic runtime mapping of first metadata associated with the metrics and the events in the first database having the timeseries schema with corresponding second metadata in a second database having a second schema different from the timeseries schema, where the second database contains information of a topology of the network, the first metadata includes tags included in the metrics and the events, and the second metadata includes keys included in the second database.

Management action initiation instructions 512 initiate a management action to address the issue based on the dynamic runtime mapping.

A storage medium (e.g., 300 in FIG. 3 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   store, in a first database having a first schema, metrics received from a network comprising communication nodes, the metrics relating to operations of the communication nodes, and the first database associating the metrics with one or more tags corresponding to hierarchical components in a topology of the network;
   store, in a second database having a second schema different than the first schema, an information of the topology of the network, comprising an indication of the hierarchical components and how the hierarchical components are related to one another;
   receive an alert relating to an issue in the network, the alert comprising an identifier of a first component of the hierarchical components that is associated with the alert; and
   in response to the alert:
      trigger collection of additional metric data at a first sampling rate, wherein the metrics are received from the network at a second sampling rate less than the first sampling rate;
      compute a health measure based on the metrics and the additional metric data, the health measure indicating a health status of the first component,
      perform a dynamic runtime mapping between the first schema and the second schema, based upon schema mapping information indicating one or more keys of the second schema that correspond to the one or more tags of the first schema;
      correlate one or more tag values of the one or more tags in the first database that are associated with a subset of the metrics corresponding to the identifier of the first component with corresponding one or more key values in the second database that identify the first component in to associate the subset of the metrics with a corresponding subset of the information of the topology of the network contained by the second database;
      identify a subset of the hierarchical components affected by the alert from the information of the topology of the network stored in the second database, based upon the corresponding subset of the information of the topology of the network;
      initiate a management action on one or more of the subset of the hierarchical components affected by the alert to address the health status based on the health measure and the corresponding subset of the information of the topology of the network;
      identify that the issue in the network has been resolved; and
      in response to identifying that the issue in the network has been resolved, decrease the first sampling rate.

2. The non-transitory machine-readable storage medium of claim 1, wherein the alert is based on local processing of metrics by one or more of the communication nodes.

3. The non-transitory machine-readable storage medium of claim 1, wherein the additional metric data comprises a different metric type than a metric type of the metrics received from the network prior to the alert and the instructions upon execution cause the system to:
   create, at runtime, a schema to store the additional metric data that comprises the different metric type.

4. The non-transitory machine-readable storage medium of claim 1, wherein the identified subset of the hierarchical components affected by the alert comprises at least one hierarchical component other than the first component.

5. The non-transitory machine-readable storage medium of claim 1, wherein the instructions upon execution cause the system to:
   access information associating a list of metrics with the first component; and
   identify one or more metrics to collect based on the list of metrics,
   wherein the triggering of the collection of the additional metric data is based on the identified one or more metrics.

6. The non-transitory machine-readable storage medium of claim 1, wherein the first database having the first schema comprises a timeseries database.

7. The non-transitory machine-readable storage medium of claim 6, wherein the second database having the second schema is selected from among a relational database having a relational schema, a graph having a graph-based schema, or a database having a document-based schema.

8. The non-transitory machine-readable storage medium of claim 1, wherein the instructions upon execution cause the system to:
initiate at least one of: adjusting forwarding of data units by a switch or group of switches or setting a port to an inactive state as the management action.

9. The non-transitory machine-readable storage medium of claim 1, wherein the hierarchical components comprise at least one of: a port of a communication node, a communication node, or a group of communication nodes.

10. A method comprising:
receiving, at a system comprising a hardware processor, metrics and events from communication nodes in a network, wherein the events are generated by the communication nodes based on local processing of the metrics at the communication nodes;
storing, by the system, the metrics and the events in a first database having a first schema;
storing, in a second database having a second schema different than the first schema, an information of a topology of the network, comprising an indication of hierarchical components of the network and how the hierarchical components are related to one another;
in response to an event comprising an alert relating to an issue in a component of the hierarchical components of the network, the alert comprising an identifier of the component:
triggering, by the system, one or more communication nodes in the network to collect additional metric data associated with the component of the hierarchical components of the network at a first sampling rate, wherein the metrics are received from the communications nodes in the network at a second sampling rate less than the first sampling rate;
performing, by the system, dynamic runtime mapping between the first schema and the second schema, based upon schema mapping information indicating one or more keys of the second schema that correspond to one or more tags of the first schema;
correlating one or more tag values of the one or more tags of the first schema associated with a subset of the metrics and the events, in the first database, corresponding to the identifier of the component of the hierarchical components of the network with corresponding one or more key values in the second database that identify the component of the hierarchical components of the network to associate the subset of the metrics and the events with a corresponding subset of the information of the topology of the network contained by the second database;
identifying a subset of the hierarchical components affected by the alert from the information of the topology of the network stored in the second database, based upon the corresponding subset of the information of the topology of the network;
initiating, by the system, a management action on the subset of the hierarchical components affected by the alert to address the issue based on the corresponding subset of the information of the topology of the network;
identifying that the issue in the network has been resolved; and
in response to identifying that the issue in the network has been resolved, decreasing the first sampling rate.

11. The method of claim 10, wherein the first schema is a timeseries database, and the second schema is selected from among a relational schema, a graph-based schema, or a document-based schema.

12. A system comprising:
a processor; and
a non-transitory storage medium storing instructions executable on the processor to:
store metrics and events received from communication nodes in a network in a first database having a timeseries schema;
store, in a second database having a relational schema different than the timeseries schema, an information of a topology of the network, comprising an indication of hierarchical components of the network and how the hierarchical components are related to one another;
in response to an event comprising an alert relating to an issue in a component of the hierarchical components of the network, the alert comprising an identifier of a component of the hierarchical components that is associated with the alert:
trigger one or more communication nodes in the network to collect additional metric data corresponding to the component of the hierarchical components of the network at a first sampling rate, wherein the metrics are received from the communications nodes in the network at a second sampling rate less than the first sampling rate;
perform dynamic runtime mapping between the timeseries schema and the relational schema, based upon schema mapping information indicating one or more keys of the relational schema that correspond to one or more tags of the timeseries schema;
correlate one or more tag values of the one or more tags of the timeseries schema associated with a subset of the metrics and the events, in the first database, corresponding to the identifier of the component of the hierarchical components of the network with corresponding one or more key values in the second database that identify the component of the hierarchical components of the network to associate the subset of the metrics and the events with a corresponding subset of the information of the topology of the network contained by the second database;
identify a subset of the hierarchical components affected by the alert from the information of the topology of the network stored in the second database, based upon the corresponding subset of the information of the topology of the network;
initiate a management action on the subset of the hierarchical components affected by the alert to address the issue based on the corresponding subset of the information of the topology of the network;
identify that the issue in the network has been resolved; and
in response to identifying that the issue in the network has been resolved, decrease the first sampling rate.

13. The system of claim 12, wherein the tags and the keys comprise identifiers of components in the network.

14. The non-transitory machine-readable storage medium of claim 1, wherein the instructions upon execution cause the system to:
initiate the management action by instructing a control plane of the network to perform a control plane action comprising at least one of: updating forwarding information in one or more switches of the network, adjusting an activation status of a port or lane of links in the network, or adjusting a configuration of the network.

* * * * *